(No Model.)
W. J. McLEAN.
STEAM ACTUATED VALVE.
No. 285,827. Patented Oct. 2, 1883.
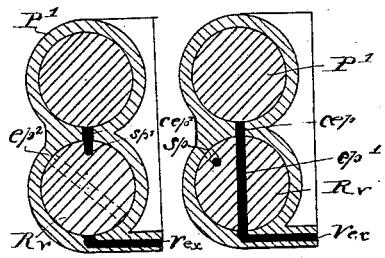
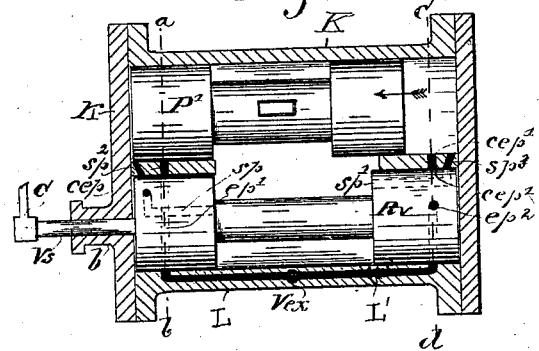
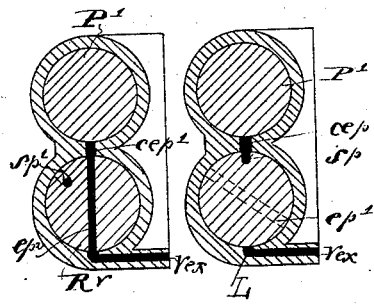
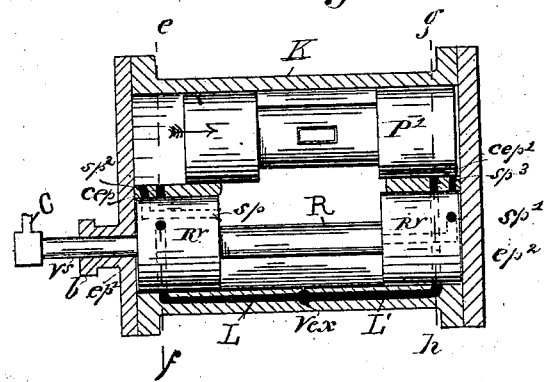
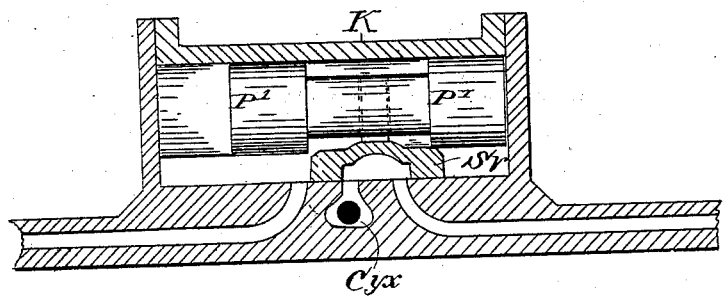
WITNESSES.
Jacob W. Loeper,
Geo. B. Parkinson.
INVENTOR.
W. J. McLean
By C. P. Jacobs
Atty.

UNITED STATES PATENT OFFICE.

WILLIAM J. McLEAN, OF INDIANAPOLIS, INDIANA.

STEAM-ACTUATED VALVE.

SPECIFICATION forming part of Letters Patent No. 285,827, dated October 2, 1883.

Application filed March 19, 1883. (No model.)

*To all whom it may concern:*

Be it known that I, WILLIAM J. McLEAN, of Indianapolis, Indiana, have invented a new and useful Improvement in Steam-Actuated Valves for Steam-Pumps, of which the following is a description, reference being made to the accompanying drawings, in the several figures of which like letters indicate like parts.

My invention relates to the construction of steam-actuated valves for direct-acting steam-pumps, and its construction and operation will be hereinafter explained.

In the drawings, Figure 1 is a plan view of my device, showing the casing in section, and Fig. 2 is a similar view, the plunger being at the other end of its cylinder. Fig. 3 is a vertical section on the line $a\,b$, Fig. 1; Fig. 4, a vertical section on the line $c\,d$, Fig. 1. Fig. 5 is a vertical section on the line $e\,f$, Fig. 2. Fig. 6 is a vertical section on the line $g\,h$, Fig. 2. Fig. 7 is a longitudinal section of the cylinder in which the plunger moves, showing the plunger and slide-valve attached and the main parts of the steam-cylinder.

In detail, K is a casing, with two cylindrical openings, in the one of which moves the plunger P', and in the other the rotary valve Rv, having two similar ends rigidly connected by rod R, which are fitted to rotate freely in the cylinder, and are connected by the stem $vs$ to the rocker-arm O. In each of these ends or valves is one opening extending through from one side to the other, $ep'\ ep^2$, which are intended as exhaust-ports, and to be connected for such purpose, by the rotary movement of the valves, with two exhaust-ports formed in the casing $cep$ and $cep'$.

Two steam-port openings, $sp$ and $sp'$, are bored from the inner ends of the valves to nearly the opposite ends, and from thence they lead at right angles out to the surface of the valve, and these connect by the rotary movement of the valves with ports formed in the casing $sp^2\ sp^3$ to admit steam in behind the head of the plunger. $vex$ is the valve exhaust-port.

The valve Rv is rotated by any suitable mechanism, and its movement limited by the well-known device of a rocker-arm.

The slide-valve Sv is connected with the plunger P' in the ordinary way, as shown in Fig. 7, $cyx$ being the main exhaust. The arrows indicate the direction the steam is expanding and forcing the plunger in Figs. 1 and 2.

Steam being admitted into the open space between the plunger and valve-cylinders, Fig. 1, passes through the ports $sp'$ and $sp^3$, behind the head of the plunger, and forces it to the other end in the direction of the arrow. The rotary valve, being actuated at the same time, turns in a reverse direction, so as to open the connecting steam-ports $sp$ and $sp^2$, close the connection between the exhaust-ports $cep$ and $ep'$, and to close the opposite steam-ports, $sp'$ $sp^3$, and open the exhaust-ports $ep^2$ and $cep'$. The steam thus is allowed to make its way in behind the left-hand plunger-head and force it forward in the direction of the arrow, Fig. 2, the steam at the opposite end freely escaping through the now open exhaust-ports $cep'$ and $ep^2$ into the longitudinal groove L' in the casing K, and thence through the vertical exhaust-opening $vex$. L is a groove in the casing communicating with opening $ep'$ in the valve Rv. The groove L has the same function as the groove L', and both communicate with the same exhaust-opening, and this alternate movement is maintained by the plunger and rotary valve as long as the actuating mechanism is kept in motion, and with little friction or wear of parts.

My device is simple and effective, and from what I have herein set forth will doubtless be readily understood by any one skilled in the manufacture or operation of such devices.

What I claim, and desire to secure by Letters Patent, is—

1. The double rotary valves Rv, connected by rod R, and provided with stem $vs$, all rigidly united and actuated by rock-arm C, the valves Rv each having a central exhaust-opening, $ep'\ ep^2$, said openings being at right angles to each other, said valves having longitudinal steam-ports $sp\ sp'$, each of which is provided, near its outer end, with openings communicating with the periphery of the valve, in combination with the casing K, provided with exhaust-grooves $cep$, $cep'$, and L L', and vertical exhaust-opening $vex$, the casing-grooves $sp^2$, $sp^3$, and $cep\ cep'$ being horizontally interposed between the rotary valves and plungers, substantially as described, and for the purpose set forth.

2. The double rotary valves $Rv$, connected by rod $R$, and provided with stem $vs$, said valves having central transverse exhaust-openings $ep\ ep^2$, said openings being at right angles from each other, said valves having longitudinal steam-ports $sp\ sp'$, extending from their respective inner ends to nearly the opposite outside ends, where they are intersected by right-angled openings in the peripheries of the rotary valves, as specified, in combination with the exhaust-casing grooves $cep\ cep'\ L\ L'$, the exhaust-casing opening $vex$, communicating with grooves $L\ L'$ and the steam-port grooves $sp^2\ sp^3$, and the plunger $P'$, suitably connected to the slide-valve $Sv$, substantially as described, and for the purpose set forth.

In witness whereof I have hereunto set my hand this 6th day of March, 1883.

WILLIAM J. McLEAN.

Witnesses:
C. P. JACOBS,
JACOB W. LOEPER.